(12) United States Patent
Iwasaki

(10) Patent No.: US 8,230,330 B2
(45) Date of Patent: Jul. 24, 2012

(54) REWRITING A PART OF A FIRST FLOW DESCRIPTION DOCUMENT INTO A REFERENCE TO A CORRESPONDING PART OF A SECOND FLOW DESCRIPTION DOCUMENT

(75) Inventor: Shingo Iwasaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 12/172,975

(22) Filed: Jul. 14, 2008

(65) Prior Publication Data

US 2009/0037811 A1 Feb. 5, 2009

(30) Foreign Application Priority Data

Jul. 31, 2007 (JP) ................. 2007-199236

(51) Int. Cl.
*G06F 17/00* (2006.01)

(52) U.S. Cl. ................. 715/234; 715/242; 715/229

(58) Field of Classification Search ........... 715/242
See application file for complete search history.

(56) References Cited

U.S. PATENT DOCUMENTS

| 7,047,281 | B1* | 5/2006 | Kausik | 709/213 |
|---|---|---|---|---|
| 7,437,662 | B1* | 10/2008 | Yu et al. | 715/229 |
| 7,913,161 | B2* | 3/2011 | Rivas et al. | 715/229 |
| 2002/0087547 | A1* | 7/2002 | Kausik et al. | 707/10 |
| 2005/0198639 | A1 | 9/2005 | Matsui | 718/100 |
| 2006/0190926 | A1* | 8/2006 | Bennett et al. | 717/114 |
| 2008/0077848 | A1* | 3/2008 | Roberts | 715/229 |

FOREIGN PATENT DOCUMENTS

JP 10-302002 11/1998

* cited by examiner

*Primary Examiner* — Stephen Hong
*Assistant Examiner* — Asher Kells
(74) *Attorney, Agent, or Firm* — Fitzpatrick, Cella, Harper & Scinto

(57) ABSTRACT

An apparatus which processes a flow description document detects a common part between the first and second flow description documents, and rewrites the common part in the second flow description document into a reference to that in the first flow description document.

16 Claims, 18 Drawing Sheets

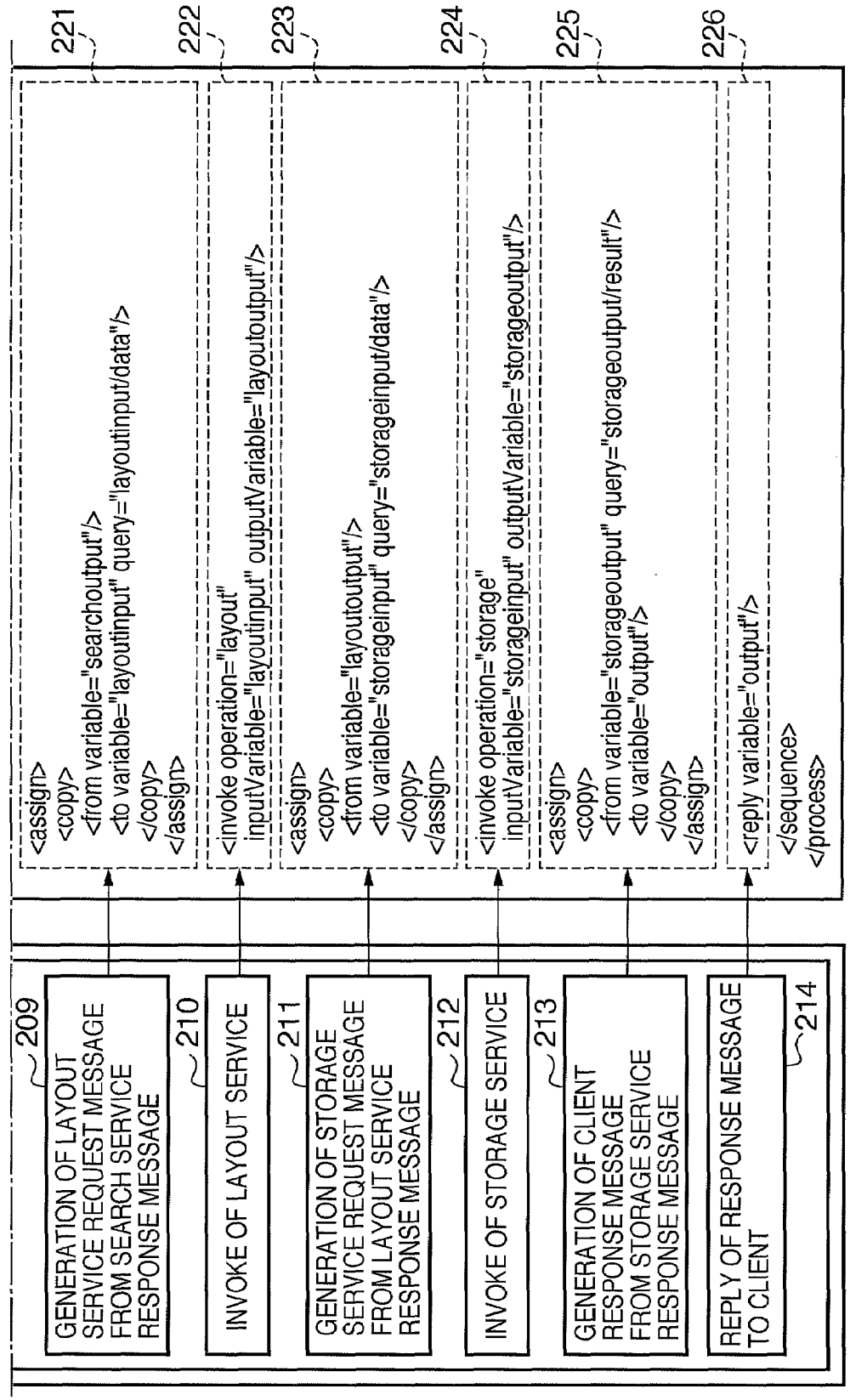

FIG. 3B

```
<assign>
  <copy>
    <from variable="input"/>
    <to variable="searchinput" query="searchinput/keyword"/>
  </copy>
</assign>

<invoke operation="search"
  inputVariable="searchinput" outputVariable="searchoutput"/>

<assign>
  <copy>
    <from variable="searchoutput"/>
    <to variable="layoutinput" query="layoutinput/data"/>
  </copy>
</assign>

<invoke operation="layout"
  inputVariable="layoutinput" outputVariable="layoutoutput"/>

<assign>
  <copy>
    <from variable="layoutoutput"/>
    <to variable="storageinput" query="storageinput/data"/>
  </copy>
</assign>

<invoke operation="storage"
  inputVariable="storageinput" outputVariable="storageoutput"/>
```

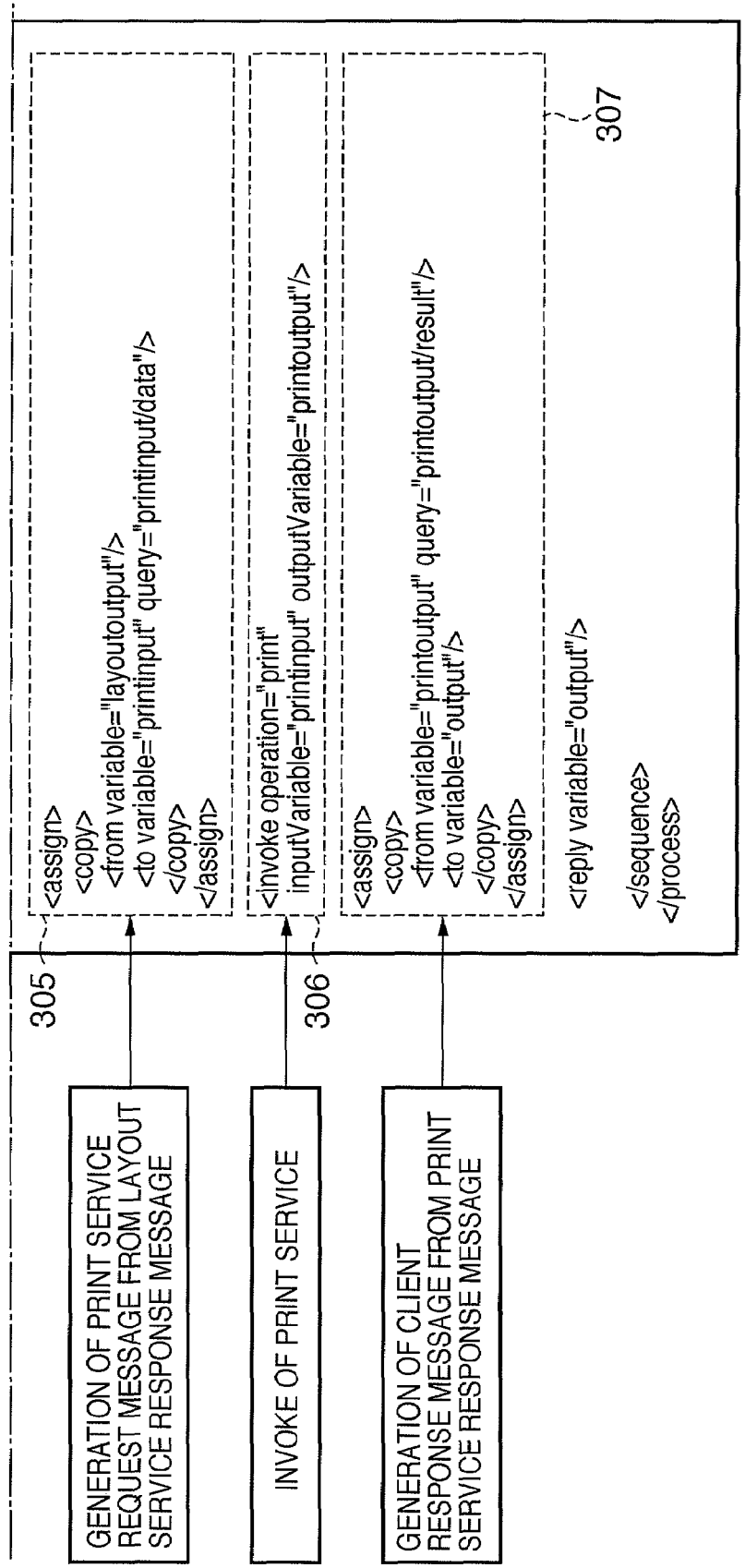

```xml
<process targetNamespace="http://www.sample.com/bpel1"
  xmlns:searchwsdl="http://www.sample.com/SearchService.wsdl"
  xmlns:layoutwsdl="http://www.sample.com/LayoutService.wsdl"
  xmlns:storagewsdl="http://www.sample.com/StorageService.wsdl"
  xmlns:xsd="http://www.w3.org/2001/XMLSchema" >
<variables>
  <variable name="input" type="xsd:string"/>
  <variable name="output" type="xsd:string"/>
  <variable name="searchinput" messageType="searchwsdl:Request"/>
  <variable name="searchoutput" messageType="searchwsdl:Response"/>
  <variable name="layoutinput" messageType="layoutwsdl:Request"/>
  <variable name="layoutoutput" messageType="layoutwsdl:Response"/>
  <variable name="storageinput" messageType="storagewsdl:Request"/>
  <variable name="storageoutput" messageType="storagewsdl:Response"/>
</variables>
<sequence>
  <receive variable="input"/>
  <assign>
    <copy>
      <from variable="input"/>
      <to variable="searchinput" query="searchinput/keyword"/>
    </copy>
  </assign>
```

503

504

502

```xml
<process targetNamespace="http://www.sample.com/bpel2"
  xmlns:searchwsdl="http://www.sample.com/SearchService.wsdl"
  xmlns:layoutwsdl="http://www.sample.com/LayoutService.wsdl"
  xmlns:storagewsdl="http://www.sample.com/StorageService.wsdl"
  xmlns:printwsdl="http://www.sample.com/PrintService.wsdl"
  xmlns:xsd="http://www.w3.org/2001/XMLSchema" >
<variables>
  <variable name="input" type="xsd:string"/>
  <variable name="output" type="xsd:string"/>
  <variable name="searchinput" messageType="searchwsdl:Request"/>
  <variable name="searchoutput" messageType="searchwsdl:Response"/>
  <variable name="layoutinput" messageType="layoutwsdl:Request"/>
  <variable name="layoutoutput" messageType="layoutwsdl:Response"/>
  <variable name="storageinput" messageType="storagewsdl:Request"/>
  <variable name="storageoutput" messageType="storagewsdl:Response"/>
  <variable name="printinput" messageType="printwsdl:Request"/>
  <variable name="printoutput" messageType="printwsdl:Response"/>
</variables>
<sequence>
  <receive variable="input"/>
  <assign>
    <copy>
      <from variable="input"/>
```

FIG. 5B

```
<invoke operation="search"
inputVariable="searchinput" outputVariable="searchoutput"/>
<assign>
  <copy>
    <from variable="searchoutput"/>
    <to variable="layoutinput" query="layoutinput/data"/>
  </copy>
</assign>
<invoke operation="layout"
inputVariable="layoutinput" outputVariable="layoutoutput"/>
<assign>
  <copy>
    <from variable="layoutoutput"/>
    <to variable="storageinput" query="storageinput/data"/>
  </copy>
</assign>
<invoke operation="storage"
inputVariable="storageinput" outputVariable="storageoutput"/>
<assign>
  <copy>
    <from variable="storageoutput"/>
    <to variable="output" query="output/result"/>
  </copy>
</assign>
```

```
<to variable="searchinput" query="searchinput/keyword"/>
  </copy>
</assign>
<invoke operation="search"
inputVariable="searchinput" outputVariable="searchoutput"/>
<assign>
  <copy>
    <from variable="searchoutput"/>
    <to variable="layoutinput" query="layoutinput/data"/>
  </copy>
</assign>
<invoke operation="layout"
inputVariable="layoutinput" outputVariable="layoutoutput"/>
<assign>
  <copy>
    <from variable="layoutoutput"/>
    <to variable="storageinput" query="storageinput/data"/>
  </copy>
</assign>
<invoke operation="storage"
inputVariable="storageinput" outputVariable="storageoutput"/>
```

F I G. 5C

```
    <assign>
      <copy>
        <from variable="layoutoutput"/>
        <to variable="printinput" query="printinput/data"/>
      </copy>
    </assign>
    <invoke operation="print"
      inputVariable="printinput" outputVariable="printoutput"/>
    <assign>
      <copy>
        <from variable="printoutput"/>
        <to variable="output" query="output/result"/>
      </copy>
    </assign>
    <reply variable="output"/>
  </sequence>
</process>
```

FIG. 6A
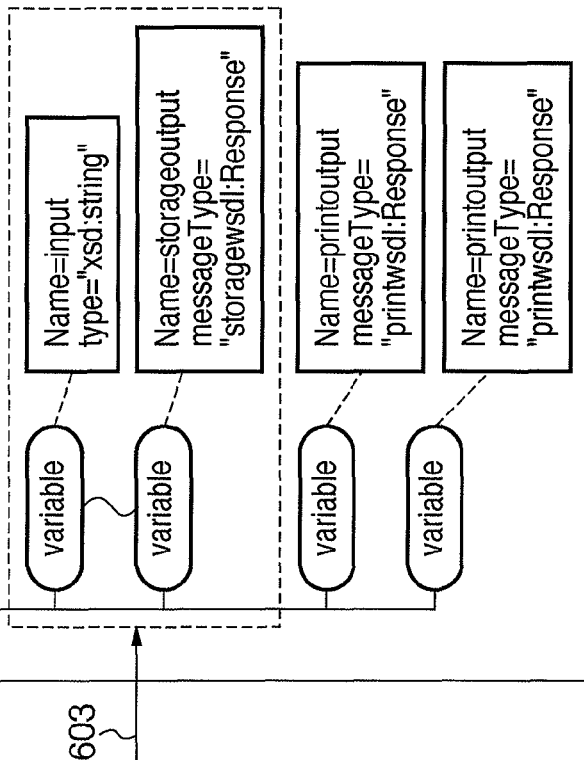
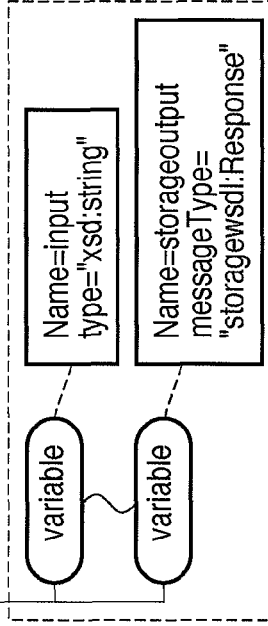
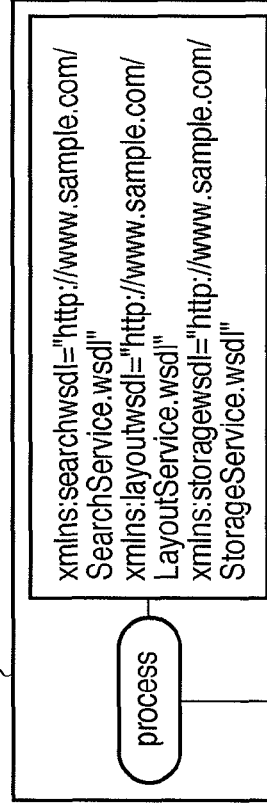

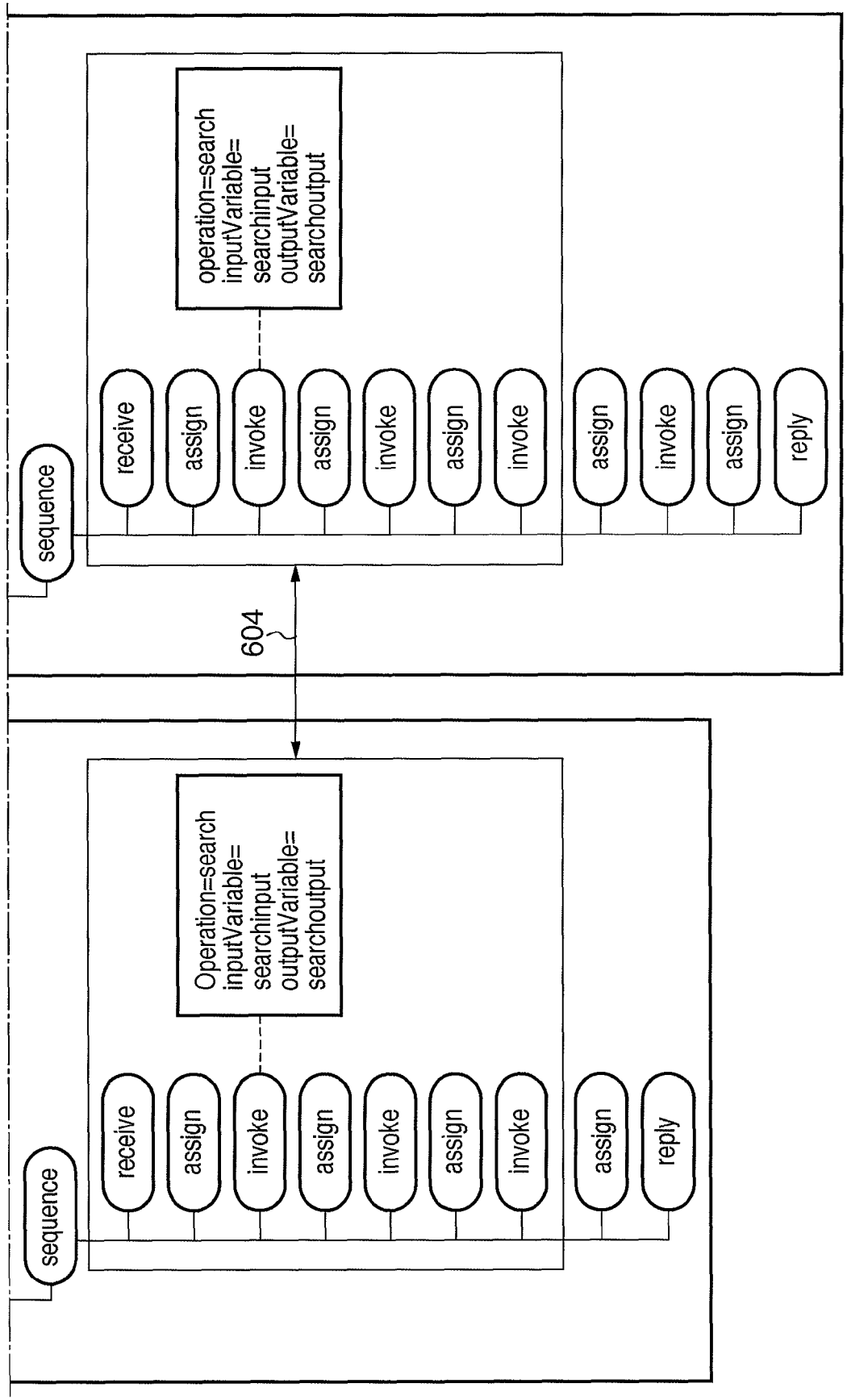

```
<process targetNamespace="http://www.sample.com/bpel1"
  xmlns:searchwsdl="http://www.sample.com/SearchService.wsdl"
  xmlns:layoutwsdl="http://www.sample.com/LayoutService.wsdl"
  xmlns:storagewsdl="http://www.sample.com/StorageService.wsdl"
  xmlns:xsd="http://www.w3.org/2001/XMLSchema" >
<variables>
  <variable name="input" type="xsd:string"/>
  <variable name="output" type="xsd:string"/>
  <variable name="searchinput" messageType="searchwsdl:Request"/>
  <variable name="searchoutput" messageType="searchwsdl:Response"/>
  <variable name="layoutinput" messageType="layoutwsdl:Request"/>
  <variable name="layoutoutput" messageType="layoutwsdl:Response"/>
  <variable name="storageinput" messageType="storagewsdl:Request"/>
  <variable name="storageoutput" messageType="storagewsdl:Response"/>
</variables>                                                          703
<sequence>
  <receive variable="input"/>
  <assign>
    <copy>
      <from variable="input"/>
      <to variable="searchinput" query="searchinput/keyword"/>
    </copy>
  </assign>
  <invoke operation="search"
    inputVariable="searchinput" outputVariable="searchoutput"/>
```

702

```
<process targetNamespace="http://www.sample.com/bpel2"
  xmlns:searchwsdl="http://www.sample.com/SearchService.wsdl"
  xmlns:layoutwsdl="http://www.sample.com/LayoutService.wsdl"
  xmlns:storagewsdl="http://www.sample.com/StorageService.wsdl"
  xmlns:printwsdl="http://www.sample.com/PrintService.wsdl"
  xmlns:xsd="http://www.w3.org/2001/XMLSchema" >
<variables>                                                704
  <link target="http://www.sample.com/bpel1"
    from="/variables/variable[0]"
    to="/variables/variable[7]"/>
  <variable name="printinput" messageType="printwsdl:Request"/>
  <variable name="printoutput" messageType="printwsdl:Response"/>
</variables>                                               706
<sequence>
  <link target="http://www.sample.com/bpel1"
    from="/sequence/receive[0]"
    to="/sequence/invoke[2]"/>
  <assign>
    <copy>
      <from variable="layoutoutput"/>
      <to variable="printinput" query="printinput/data"/>
    </copy>
  </assign>
```

705

F I G. 7B

```xml
<assign>
  <copy>
    <from variable="searchoutput"/>
    <to variable="layoutinput" query="layoutinput/data"/>
  </copy>
</assign>
<invoke operation="layout"
  inputVariable="layoutinput" outputVariable="layoutoutput"/>
<assign>
  <copy>
    <from variable="layoutoutput"/>
    <to variable="storageinput" query="storageinput/data"/>
  </copy>
</assign>
<invoke operation="storage"
  inputVariable="storageinput" outputVariable="storageoutput"/>
<assign>
  <copy>
    <from variable="storageoutput"/>
    <to variable="output" query="output/result"/>
  </copy>
</assign>
<reply variable="output"/>
</sequence>
</process>
```

```xml
<invoke operation="print"
  inputVariable="printinput" outputVariable="printoutput"/>
<assign>
  <copy>
    <from variable="printoutput"/>
    <to variable="output" query="output/result"/>
  </copy>
</assign>
<reply variable="output"/>
</sequence>
</process>
```

```xml
<sequence>
<link target="http://www.sample.com/bpel1"
  from="/sequence/receive[0]"
  to="/sequence/invoke[2]"/>
<assign>
  <copy>
    <from variable="layoutoutput"/>
    <to variable="printinput" query="printinput/data"/>
  </copy>
</assign>
<invoke operation="print"
  inputVariable="printinput" outputVariable="printoutput"/>
<assign>
  <copy>
    <from variable="printoutput"/>
    <to variable="output" query="output/result"/>
  </copy>
</assign>
<reply variable="output"/>
</sequence>
```

801 / 804:

```xml
<sequence>
<receive variable="input"/>
<assign>
  <copy>
    <from variable="input"/>
    <to variable="searchinput" query="searchinput/keyword"/>
  </copy>
</assign>
<invoke operation="search"
  inputVariable="searchinput" outputVariable="searchoutput"/>
<assign>
  <copy>
    <from variable="searchoutput"/>
    <to variable="layoutinput" query="layoutinput/data"/>
  </copy>
</assign>
<invoke operation="layout"
  inputVariable="layoutinput" outputVariable="layoutoutput"/>
<assign>
  <copy>
    <from variable="layoutoutput"/>
    <to variable="storageinput" query="storageinput/data"/>
  </copy>
</assign>
```

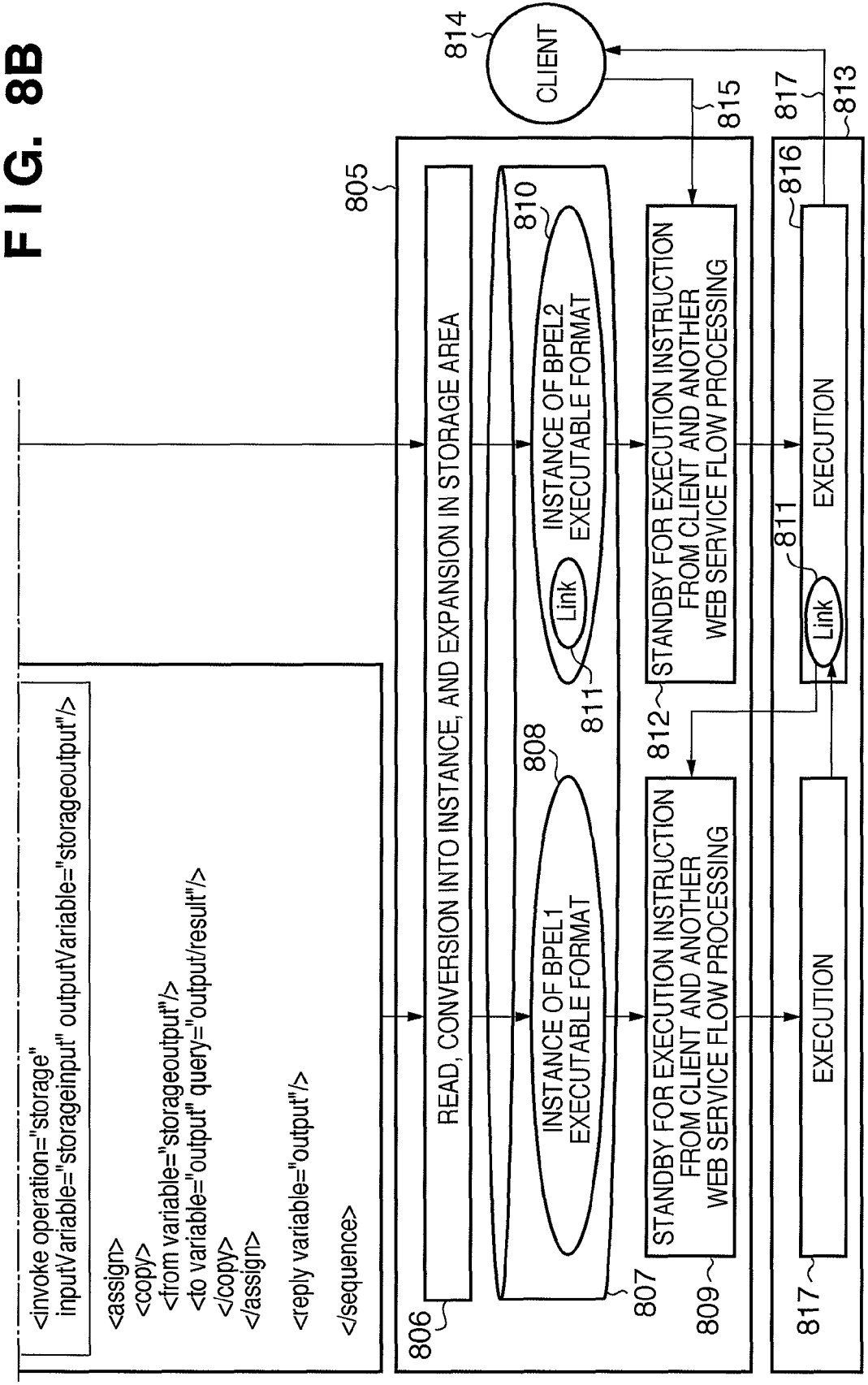

REWRITING A PART OF A FIRST FLOW DESCRIPTION DOCUMENT INTO A REFERENCE TO A CORRESPONDING PART OF A SECOND FLOW DESCRIPTION DOCUMENT

BACKGROUND OF THE INVENTION

1. Field of the Invention

The present invention relates to a flow description document processing method, apparatus, and program.

2. Description of the Related Art

There is known a technique of reading a structured document which describes a WEB service flow for sequentially executing WEB services, and sequentially executing WEB services in accordance with the description contents. The WEB service flow is described in accordance with, e.g., WSBPEL (WEB Service Business Process Execution Language).

An engine which reads a WEB service flow description document and sequentially executes WEB services in accordance with the description contents generally runs on a resource-rich personal computer or server.

How to efficiently use a plurality of flow descriptions or flow definitions to execute a flow has been studied.

Japanese Patent Laid-Open No. 10-302002 discloses an integrated workflow definition/execution method capable of listing cooperative work operations, and reusing a workflow definition between a plurality of workflow management systems which execute the same work. According to the method in Japanese Patent Laid-Open No. 10-302002, the user selects and extracts a necessary definition part from a workflow definition given for each workflow management system. Extracted definitions are combined to newly generate a workflow definition, and the workflow definition is read to execute the flow.

U.S. Publication No. 2005/0198639 discloses a method of determining a similar process from the process definitions of a plurality of workflows, and merging or reconfiguring processes into one workflow while internally adding conditional branches.

Assume that an engine for reading a WEB service flow description document and sequentially executing WEB services in accordance with the description contents is installed and activated in a device poor in resource (e.g., a memory). In this case, the number of registrable WEB service flow description documents is further limited.

SUMMARY OF THE INVENTION

It is an object of the present invention to decrease the amount of recording medium used.

It is another object of the present invention to provide a method of processing a flow description document, the method comprises steps of detecting a common part between a first flow description document and a second flow description document, and rewriting the common part in the second flow description document into a reference to the common part in the first flow description document.

It is still another object of the present invention to provide a flow description document processing apparatus comprises a detection unit which detects a common part between a first flow description document and a second flow description document, and a rewrite unit which rewrites the common part in the second flow description document into a reference to the common part in the first flow description document.

Further features of the present invention will become apparent from the following description of exemplary embodiments (with reference to the attached drawings).

BRIEF DESCRIPTION OF THE DRAWINGS

FIGS. 2A and 2B are views showing an example of a WEB service flow description document;

FIG. 3A-3C are views showing an example of a WEB service flow description document;

FIG. 5A-5C are views showing a concrete example of processing in step S411 of FIG. 4B;

FIGS. 6A and 6B are views showing a concrete example of processing in step S411 of FIG. 4B;

FIGS. 7A and 7B are views showing a concrete example of processing in step S413 of FIG. 4B;

FIGS. 8A and 8B are views showing a concrete example of processing in step S414 of FIG. 4B.

DETAILED DESCRIPTION OF THE EMBODIMENTS

A preferred embodiment to which the present invention is applied will be described in detail with reference to the accompanying drawings.

Figure 1:
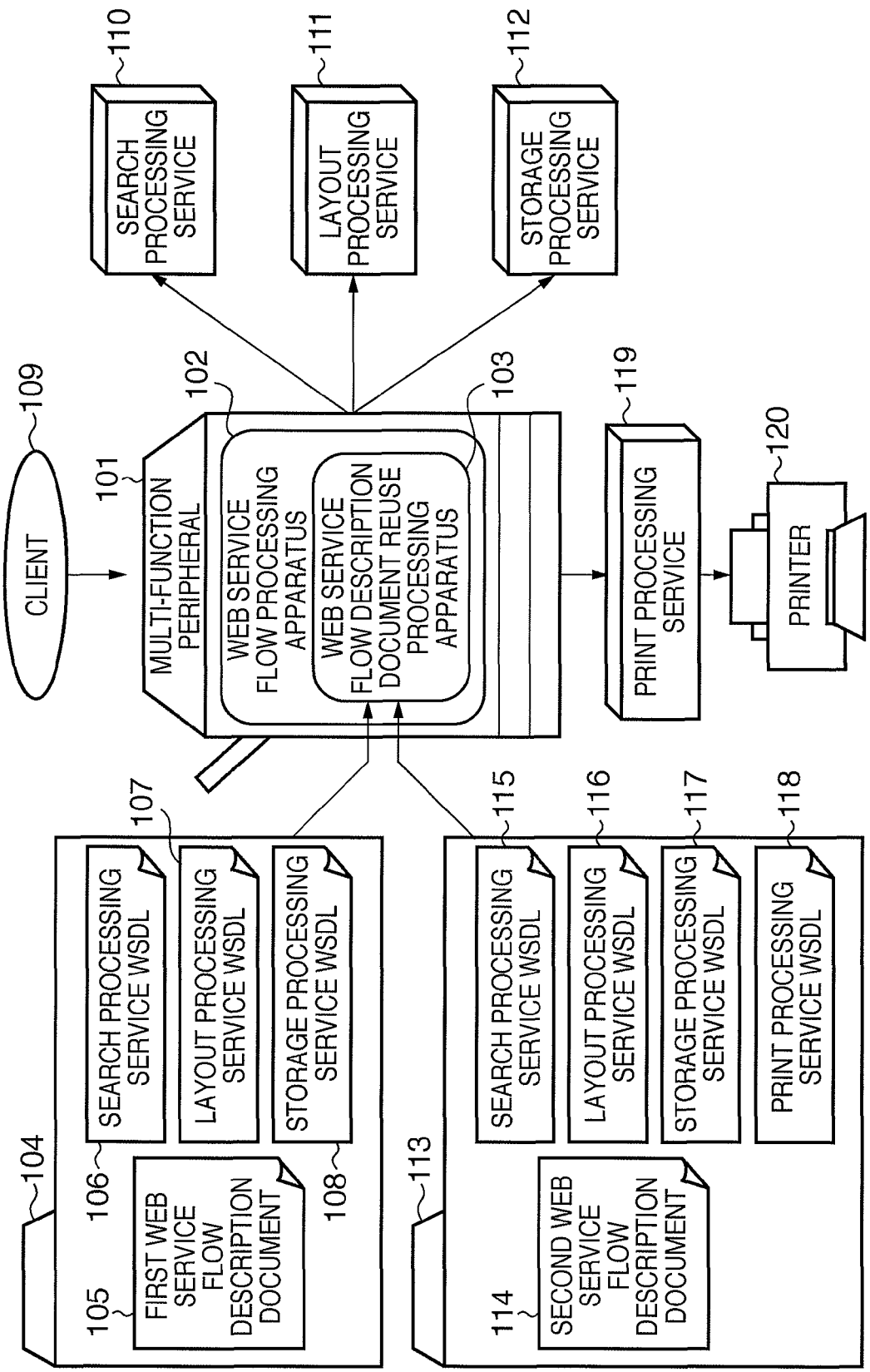
FIG. 1 is a view for explaining an application example of a reuse processing apparatus (flow description document processing apparatus) according to an embodiment of the present invention.

FIG. 1 is a view for explaining an application example of a WEB service flow description document reuse processing apparatus (flow description document processing apparatus) according to the embodiment of the present invention.

In FIG. 1, a multi-function peripheral 101 can perform processes such as copying, scanning, and printing. The multi-function peripheral incorporates a WEB service flow processing apparatus (to be simply referred to as a flow processing apparatus hereinafter) 102 capable of reading a WEB service flow description document and sequentially executing WEB services in accordance with the description contents. The flow processing apparatus 102 incorporates a WEB service flow description document reuse processing apparatus (flow description document processing apparatus) 103.

Figure 9:
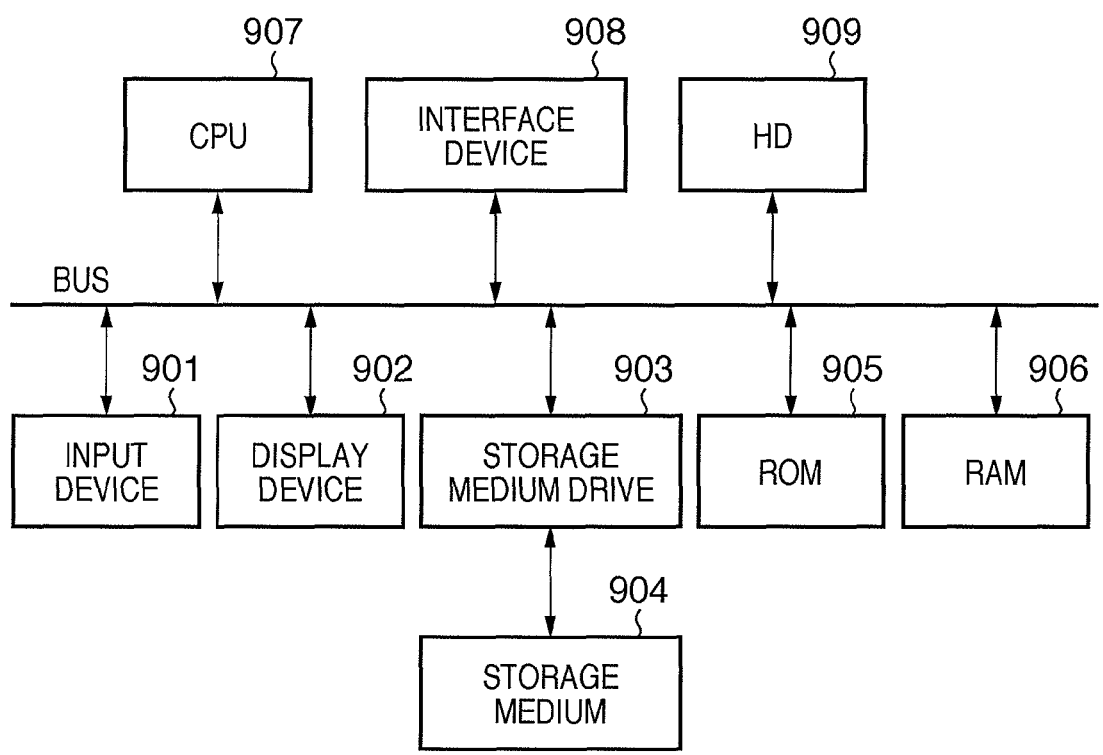
FIG. 9 is a block diagram showing an example of the hardware arrangement of the reuse processing apparatus according to the embodiment of the present invention.

FIG. 9 is a block diagram showing the arrangement of the flow processing apparatus 102 according to the embodiment of the present invention.

As shown in FIG. 9, the flow processing apparatus 102 comprises, as hardware components, an input device 901, display device 902, storage medium drive 903, ROM 905, RAM 906, CPU or MPU 907, interface device 908, and HD (Hard Disk) 909. The flow processing apparatus 102 and the WEB service flow description document reuse processing apparatus (to be simply referred to as a reuse processing apparatus hereinafter) 103 will be described as separate functions in the embodiment, but are formed from common hardware.

The input device 901 includes a keyboard, mouse, and the like which are operated by the operator of the flow processing apparatus 102. The input device 901 is used to input various pieces of operation information and the like to the flow processing apparatus 102.

The display device 902 includes a display and the like used by the operator of the flow processing apparatus 102, and is used to display various kinds of information (or windows) and the like. The interface device 908 is an interface which connects the flow processing apparatus 102 to a network or the like.

Programs associated with a flowchart (to be described later) and the like are provided to the flow processing apparatus (computer) 102 by a storage medium 904 such as a CD-ROM, or downloaded via a network or the like. A WEB service flow description document package is similarly provided or downloaded.

The storage medium 904 is set in the storage medium drive 903, and a program is installed from the storage medium 904 to the HD 909 via the storage medium drive 903. The ROM 905 stores a program and the like loaded at the beginning after the flow processing apparatus 102 is turned on.

The RAM 906 is a main memory for the flow processing apparatus 102. The CPU 907 implements a flowchart (to be described later) by reading out a program from the HD 909, storing it in the RAM 906, and executing it. The RAM 906 also corresponds to storage areas 807 and 809 (to be described later). In addition to programs, the HD 909 stores a WEB service flow description document, WSDL document, and the like.

In addition to this arrangement, the multi-function peripheral 101 has an arrangement for performing processes such as copying, scanning, and printing.

Referring back to FIG. 1, a WEB service flow description document package 104 is a combination of a first WEB service flow description document 105, search processing service WSDL document 106, layout processing service WSDL document 107, and storage processing service WSDL document 108. The search processing service WSDL document 106, layout processing service WSDL document 107, and storage processing service WSDL document 108 are WEB service interface description documents. The WEB service interface description document will be called a WSDL (Web Services Description Language) document.

Reference numeral 109 denotes a client; 110, a search processing service; 111, a layout processing service; and 112, a storage processing service. A print processing service 119 executes a print service using a printer 120. The server executes the services 110, 111, 112, and 119. The multi-function peripheral 101, the client 109, and the services 110, 111, 112, and 119 are connected to each other by a network.

The description contents of the first WEB service flow description document 105 will be explained. The first WEB service flow description document 105 describes the following contents. More specifically, a search keyword-added request is received from the client 109, a search keyword-added request message is generated for a search processing service, and the request is sent to the search processing service 110. Examples of the search processing service 110 are a news search service and book search service.

As a response to this request, the search result is received, and a search result-added request message is generated for a layout processing service. The request is sent to the layout processing service 111 which lays out search results and converts the layout into a PDF file, SVG file, or the like. As a response to this request, the layout result is received.

A layout result-added request message is generated for the storage processing service 112, and the request is sent to the storage processing service 112 which saves received files and the like. Finally, the storage processing result (e.g., successful storage or failure in storage) is received, and a storage processing result-added response message is generated and sent back to the client 109. The first WEB service flow description document 105 describes flow processing according to this flow.

The reuse processing apparatus 103 reads the WEB service flow description document package 104. The reuse processing apparatus 103 expands the information in a format executable by the flow processing apparatus 102 in the internal storage area (e.g., hard disk or memory) of the multi-function peripheral so as to prevent the information from overlapping identical one. Based on the expanded information, the flow processing apparatus 102 executes flow processing.

An outline of processing when the multi-function peripheral 101, which has read the WEB service flow description document package 104, reads a WEB service flow description document package 113 will be explained.

The WEB service flow description document package 113 is a combination of a second WEB service flow description document 114, search processing service WSDL document 115, layout processing service WSDL document 116, storage processing service WSDL document 117, and print processing service WSDL document 118.

The description contents of the second WEB service flow description document 114 will be explained. The second WEB service flow description document 114 describes the following contents. More specifically, a search keyword-added request is received from the client 109, a search keyword-added request message is generated for a search processing service, and the request is sent to the search processing service 110.

As a response to this request, the search result is received, and a search result-added request message is generated for a layout processing service. The request is sent to the layout processing service 111 which lays out search results and converts the layout into a PDF file, SVG file, or the like. As a response to this request, the layout result is received.

A layout result-added request message is generated for the storage processing service, and the request is sent to the storage processing service 112 which saves received files and the like. Subsequently, the storage processing result (e.g., successful storage or failure in storage) is received, a layout result-added response message is generated for a print processing service, and the request is sent to the print processing service 119 which prints a layout result. The printer 120 prints, and as a response to the request, the print processing result (e.g., successful print acceptance or failure in print acceptance) is received. A print processing result-added response message is generated and sent back to the client 109. The second WEB service flow description document 114 describes flow processing to be executed according to this flow.

A comparison between the first WEB service flow description document 105 and the second WEB service flow description document 114 reveals that they describe the same contents up to a flow processing description of requesting a layout result of the storage processing service 112. The second WEB service flow description document 114 additionally describes flow processing of requesting a layout result of the print processing service 119. Similarly, the WSDL documents 106 to 108 also have the same contents as those of the WSDL documents 115 to 117, and only the print processing service WSDL document 118 is different.

The processing contents of the reuse processing apparatus 103 will be explained using a concrete example of the WEB service flow description document.

Figure 2A:
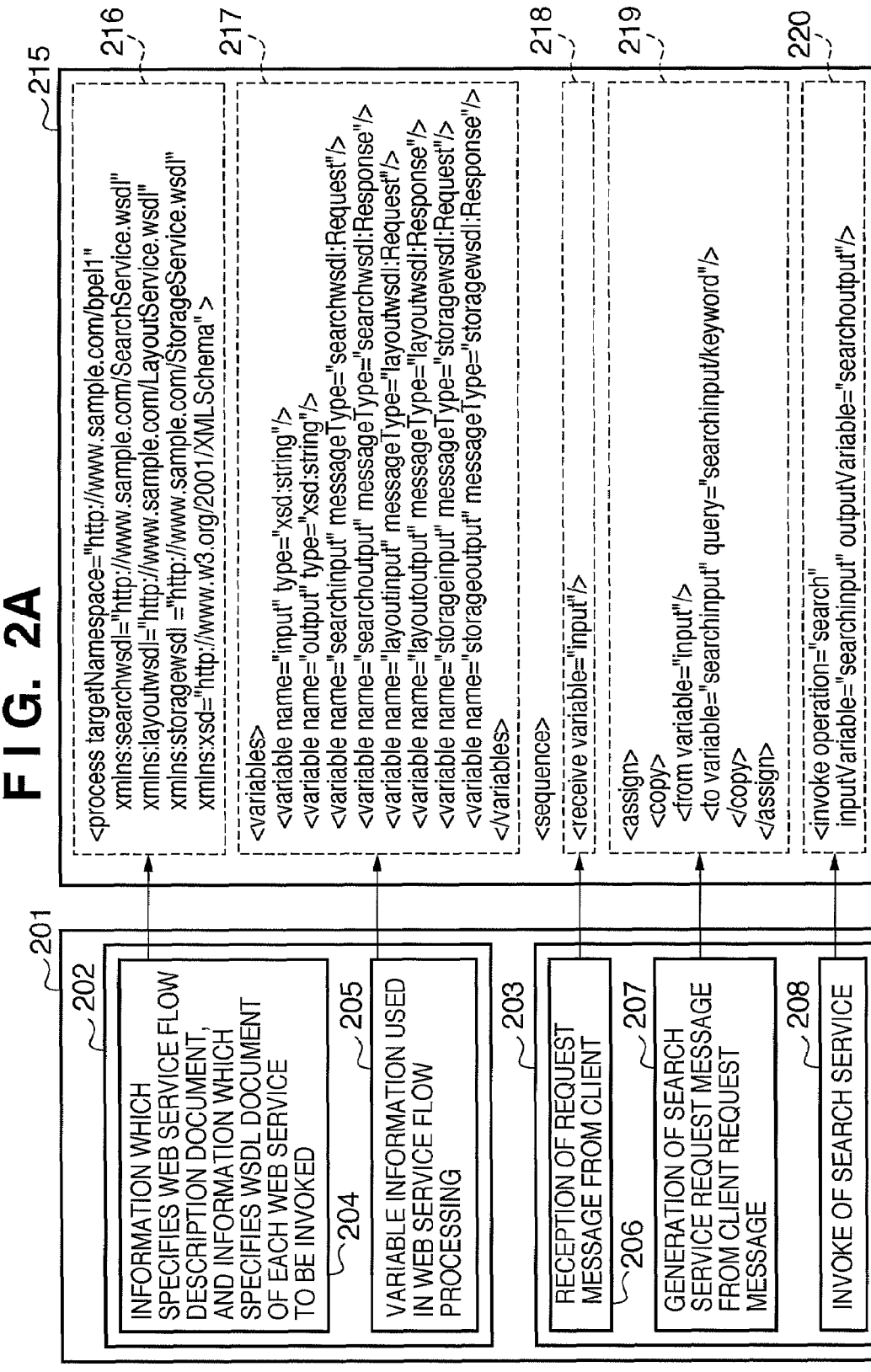

In FIGS. 2A and 2B, reference numeral 201 denotes a flow processing description of the first WEB service flow description document 105. The flow processing description 201 includes a declaration part 202 which describes a variable declaration and the like in a program, and a logic part 203 which describes the logic of flow processing and the like. The declaration part 202 includes parts 204 and 205, whereas the logic part 203 includes parts 206 to 214.

In the declaration part 202, the part 204 describes information which specifies the first WEB service flow description document 105, and information which specifies the WSDL document of each WEB service to be invoked. The part 205 describes variable information used in WEB service flow processing.

In the logic part 203, the part 206 describes processing contents to receive a request message from the client.

The part 207 describes processing contents to extract a search keyword from a received client request message, and generate a search keyword-added request message to the search processing service 110 on the basis of information of the search processing service WSDL document 106. The part 208 describes processing contents to invoke the search processing service 110 using a generated request message, cause it to perform search processing, and receive a search result response message. The part 209 describes processing contents to extract a search result from a received search result response message, and generate a search result-added request message to the layout processing service 111 on the basis of information of the layout processing service WSDL document 107.

The part 210 describes processing contents to invoke the layout processing service 111 using a generated request message, cause it to perform layout processing, and receive a layout result response message. The part 211 describes processing contents to extract a layout result from a received layout result response message, and generate a layout result-added request message to the storage processing service 112 on the basis of information of the storage processing service WSDL document 108.

The part 212 describes processing contents to invoke the storage processing service 112 using a generated request message, cause it to perform storage processing, and receive a storage processing result response message. The part 213 describes processing contents to extract a storage processing result from a received storage processing result response message, and generate a result-added response message to the client. The part 214 describes processing contents to reply to the client using a generated response message.

Reference numeral 215 denotes a concrete example of a WEB service flow description document based on an example of the structure of the WEB service flow description document represented by the flow processing description 201. The WEB service flow description document 215 is described in WSBPEL which is a standard format for describing a WEB service processing flow by an XML (extensible Markup Language) document. The WEB service flow description document represented by the flow processing description 201 will be compared with the WEB service flow description document 215. WSBPEL stands for Web Service Business Process Execution Language.

A part 216 corresponds to the description contents of the part 204. The part 216 describes, as the attribute value of a <process> tag in the name space, information which specifies the first WEB service flow description document 105, and information which specifies the WSDL document of each WEB service to be invoked. A part 217 corresponds to the description contents of the part 205. In the part 217, each <variable> tag describes type information of a message variable used to perform flow processing.

A part 218 corresponds to the description contents of the part 206. In the part 218, the <receive> tag describes processing contents to receive a request message from the client. A part 219 corresponds to the description contents of the part 207. In the part 219, the <assign> tag and the like describe processing contents to extract a search keyword from a received client request message, and generate a search keyword-added request message to the search processing service 110 on the basis of information of the search processing service WSDL document 106.

A part 220 corresponds to the description contents of the part 208. In the part 220, the <invoke> tag describes processing contents to invoke the search processing service 110 using a generated request message, cause it to perform search processing, and receive a search result response message. Similarly, parts 221 to 225 correspond to the processing contents of the parts 209 to 213. A part 226 corresponds to the processing contents of the part 214. In the part 226, the <reply> tag describes processing contents to send back a response message to the client.

The <receive>, <assign>, <invoke>, and <reply> tags corresponding to the description contents of the logic part 203 are called activities in WSBPEL. The <receive> tag describes an abstract representation of WEB service flow processing associated with reception of a message. The <assign> tag describes an abstract representation of WEB service flow processing associated with processing and conversion of a message. The <invoke> tag describes an abstract representation of WEB service flow processing associated with invoke of an external WEB service. The <reply> tag describes an abstract representation of WEB service flow processing associated with reply of a message.

Figure 3A:
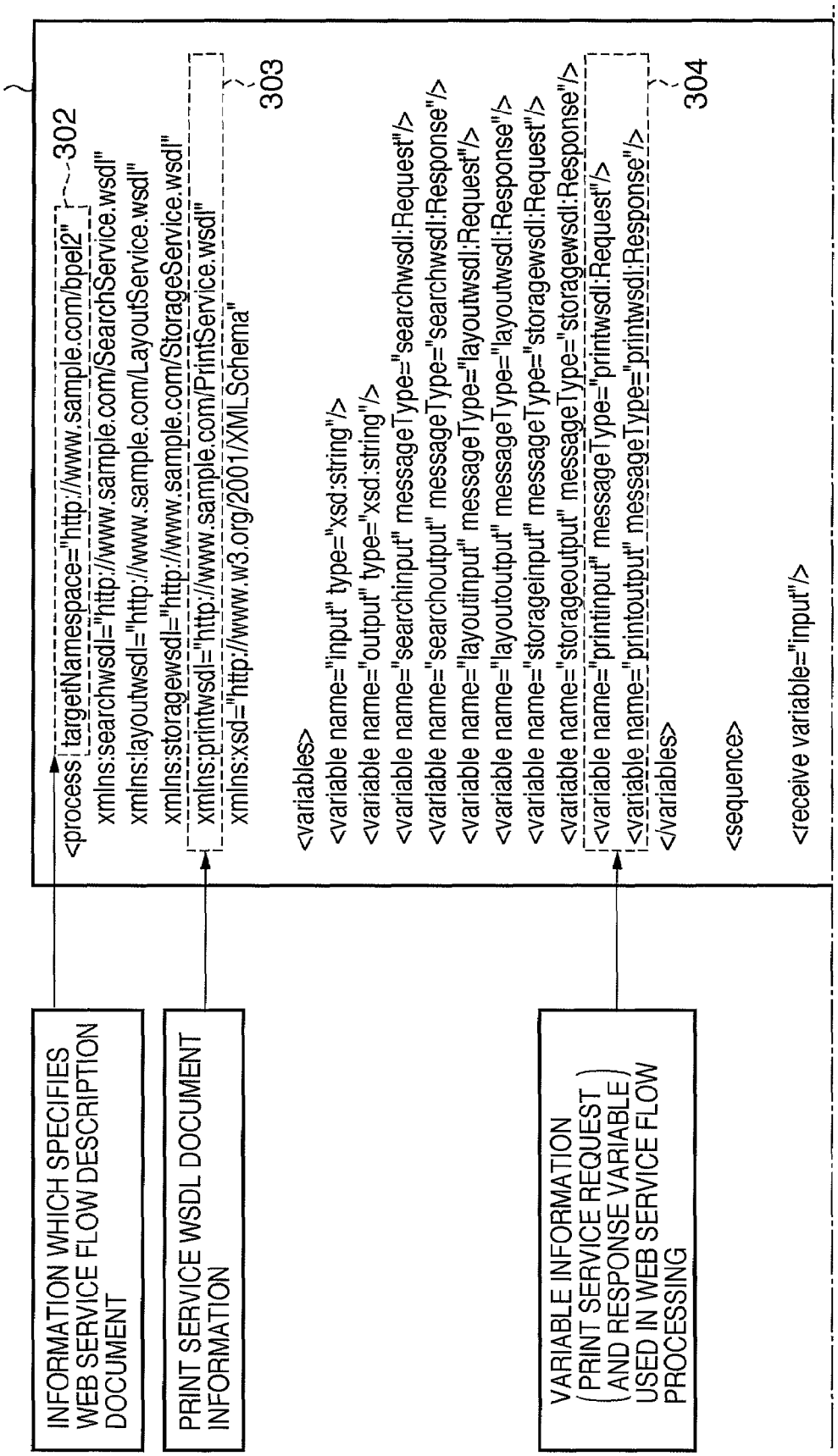

Also in FIGS. 3A-3C, similar to FIGS. 2A and 2B, WSBPEL 301 represents the flow processing description of the second WEB service flow description document 114. The difference in flow processing between the first WEB service flow description document 105 and the second WEB service flow description document 114 is whether or not to finally execute print processing. Also in the flow processing description 301, a description part associated with print processing is added to the WEBPEL 215.

A part 302 describes a name space which uniquely specifies the WSBPEL 301. A part 303 describes a name space which specifies the WSDL document of the print processing service 119. In a part 304, the <variable> tag describes type information of a message variable used to perform flow processing associated with a print processing service.

In a part 305, the <assign> tag and the like describe processing contents to extract a layout result from a response message from a received layout processing service, and generate a layout result-added request message to the print processing service 119 on the basis of information of the print processing service WSDL document 118.

In a part 306, the <invoke> tag describes processing contents to invoke the print processing service 119 using a generated request message, cause it to perform print processing, and receive a response message for a print processing result (e.g., successful print acceptance or failure in print acceptance).

In a part 307, the <assign> tag and the like describe processing contents to extract a print processing result from a response message from a received print processing service, and generate a print processing result-added response message to the client.

Figure 4A:
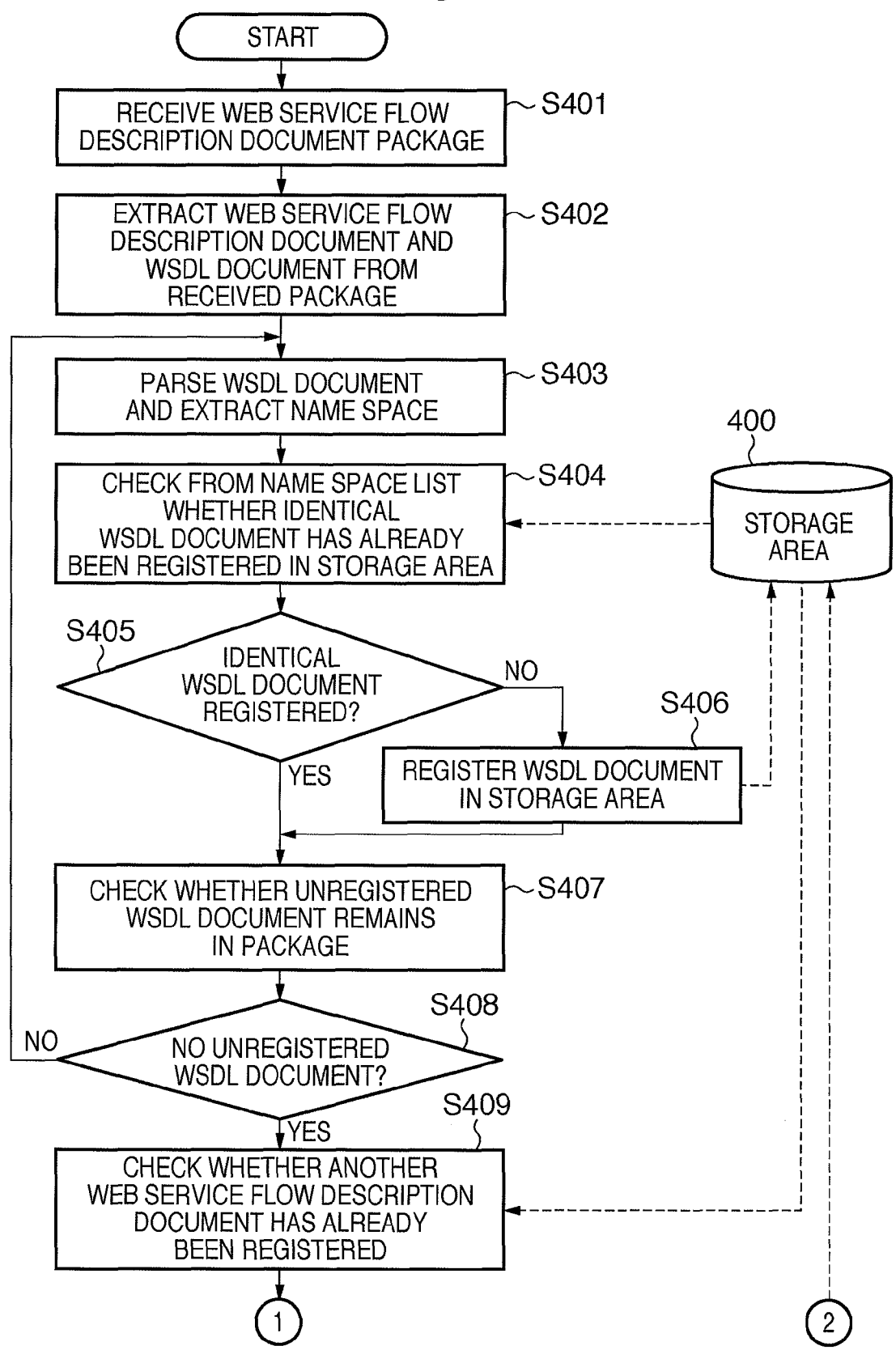
FIGS. 4A and 4B are flowcharts showing processing of the reuse processing apparatus.
Figure 4B:
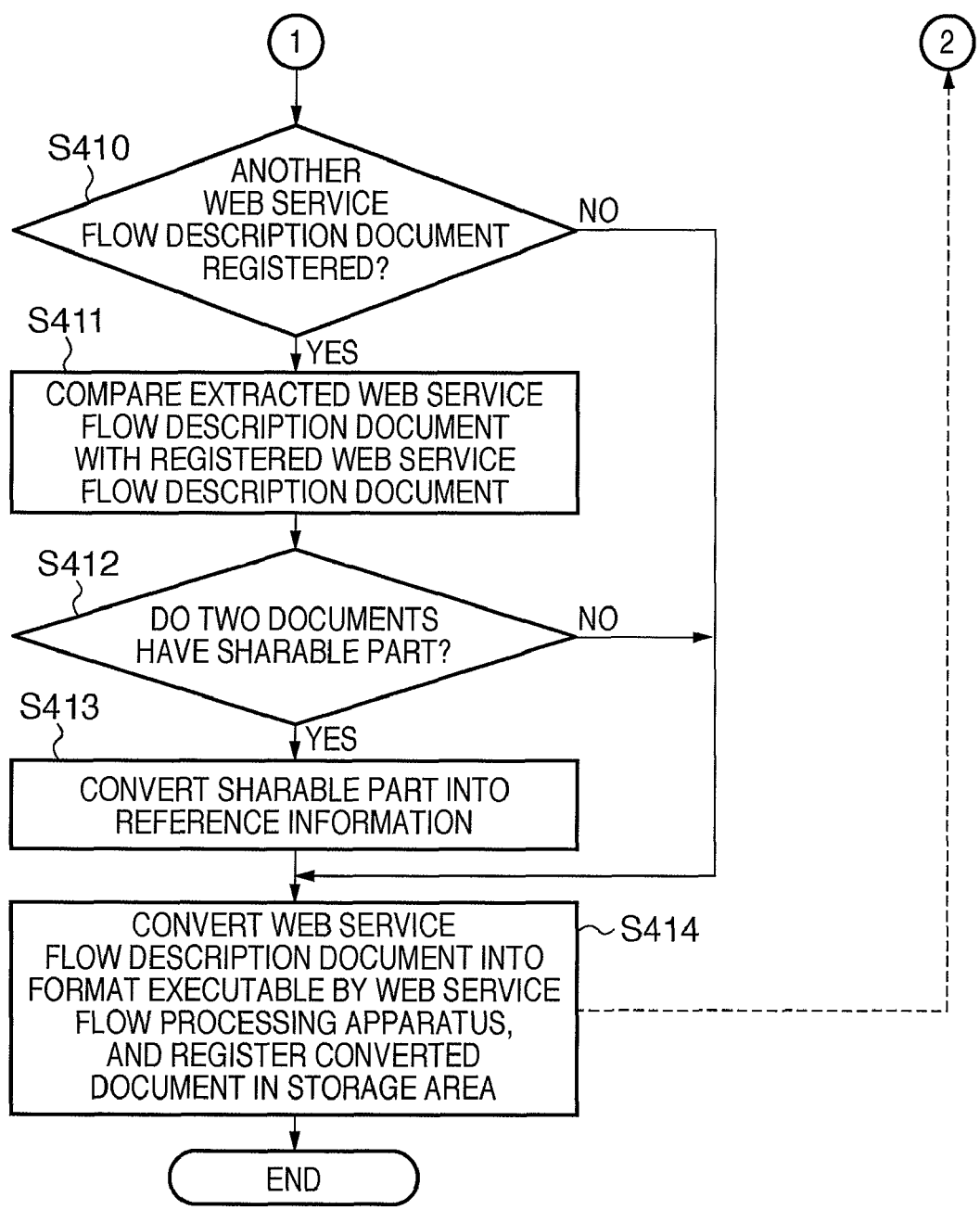

FIGS. 4A and 4B are flowcharts showing processing of the reuse processing apparatus (flow description document processing apparatus) 103.

In step S401, the reuse processing apparatus 103 receives a WEB service flow description document package. In step S402, the reuse processing apparatus 103 extracts a WEB service flow description document and WSDL document from the received WEB service flow description document package.

In step S403, the reuse processing apparatus 103 parses the extracted WSDL document to extract a name space for specifying the WSDL document.

In step S404, the reuse processing apparatus 103 uses the extracted name space as a key to check whether the WSDL document has already been registered in a storage area 400. If no identical WSDL document has been registered, the process advances from step S405 to step S406, and the reuse processing apparatus 103 registers the WSDL document in the storage area 400. After registration, the process advances to step S407. In the storage area 400, the WSDL document is managed using the name space as a key.

If the identical WSDL document has already been registered in step S404, the process advances from step S405 to step S407. In step S407, the reuse processing apparatus 103 checks whether an unregistered WSDL document still remains in the WEB service flow description document package. If an unregistered WSDL document still remains, the process returns from step S408 to step S403, and is repeated. If no unregistered WSDL document remains, the process advances to step S409.

In step S409, the reuse processing apparatus 103 checks whether another WEB service flow description document has already been registered in the storage area 400. If another WEB service flow description document has already been registered, the process advances from step S410 to step S411.

In step S411, the reuse processing apparatus 103 compares the WEB service flow description document extracted in step S402 with another WEB service flow description document registered in the storage area 400. In step S412, the reuse processing apparatus 103 determines by analysis whether these documents have a description part capable of sharing processing.

If the reuse processing apparatus 103 determines as a result of the analysis that these documents have a sharable description part, the process advances from step S412 to step S413. In step S413, the reuse processing apparatus 103 converts the sharable part of the WEB service flow description document which has been extracted in step S402 and is to be registered, into reference information to the registered WEB service flow description document.

In step S414, the reuse processing apparatus 103 converts, into a format executable by the flow processing apparatus 102, the WEB service flow description document whose sharable part has been converted into the reference information, and the WEB service flow description document to be referred to based on the reference information. The reuse processing apparatus 103 registers, in the storage area 400, the WEB service flow description document converted into the format executable by the flow processing apparatus 102. At this time, the WEB service flow description document is stored in the storage area 400 so as to refer to the other WEB service flow description document on the basis of the reference information.

If the reuse processing apparatus 103 determines in step S412 that these documents do not have a sharable description part, the process advances to step S414 without executing step S413. In step S414, the reuse processing apparatus 103 converts the WEB service flow description document extracted from the WEB service flow description document package into a format executable by the flow processing apparatus 102. Then, the reuse processing apparatus 103 registers the converted WEB service flow description document in the storage area 400.

In this case, the common part of a WEB service flow description document contained in the package received in step S401 is converted into the reference information. The common part of the WEB service flow description document stored in the storage area 400 may also be converted into reference information.

FIGS. 5A-5C schematically show a concrete example of comparison/analysis processing in step S411 of FIG. 4B. WSBPEL 501 represents the first WEB service flow description document 105. WSBPEL 502 represents the second WEB service flow description document 114. It can be determined from a comparison between, e.g., the character strings of the WSBPELs 501 and 502 that description parts 503 and 504 are common between the WSBPELs 501 and 502.

Similarly, FIGS. 6A and 6B schematically show another concrete example of comparison/analysis processing in step S411 of FIG. 4B. A tree structure 601 is obtained by reading the WSBPEL 501 once. Similarly, a tree structure 602 is obtained by reading the WSBPEL 502 once. After WSBPELs are read once and expanded into tree structures, the structures and attribute values are compared to determine that, for example, parts 603 and 604 are sharable parts between the WSBPELs. FIGS. 5A-5C, 6A, and 6B show simple concrete examples of comparison/analysis processing in step S411. However, the present invention is not limited to these methods.

FIGS. 7A and 7B show a concrete example of processing of converting a sharable part into reference information in step S413 of FIG. 4B. WSBPEL 701 is identical to the WSBPEL 501. WSBPEL 702 is obtained by replacing a sharable part of the WSBPEL 502 with reference information. More specifically, a sharable part 704 is replaced with a <link> tag having a "target" attribute, "from" attribute, and "to" attribute. A name space HYPERLINK "http://www.sample.com/bpell" which specifies the WSBPEL 701 is set in the "target" attribute. The "from" attribute represents the start from the 0th line of a <variable> tag 703, and this is designated by an XPath expression "/variables/variable[0]". The "to" attribute represents the end at the seventh line of the <variable> tag 703, and this is designated by an XPath expression "/variables/variable[7]". These attributes allow referring to the description part 703. Similarly, a sharable part 706 is also replaced with a <link> tag to allow referring to a description part 705. In this way, a sharable part is converted into reference information. Note that XPath stands for XML Path Language.

The sequence of processing of converting a WEB service flow description document into a format executable by the flow processing apparatus 102, and registering the resultant document in the storage area 400 in step S414 of FIG. 4B will be described with reference to FIGS. 8A and 8B.

WSBPEL 801 represents only information of a logic part enclosed by <sequence> and </sequence> tags in the WSBPEL 701. Also, WSBPEL 802 represents only information of a logic part enclosed by <sequence> and </sequence> tags in the WSBPEL 702. Part of a logic part 804 is referred to from a reference description part 803.

Processing 805 is to convert a WEB service flow description document into a format executable by the flow processing apparatus 102, and register the resultant document in the storage area 400 in step S414 of FIG. 4B.

In 806, the WSBPEL 801 is read and expanded in the storage area 807 into an instance format 808 capable of executing the WSBPEL. In 809, the process stands by in a state in which a request can be accepted at any time, until an execution instruction, i.e., request is received from the client or another WEB service flow processing.

Similarly, the WSBPEL 802 is read and expanded in the storage area 807 into an instance format 810 capable of executing the WSBPEL. At this time, the <link> tag information 803 is also directly expanded into an instance format 811. In 812, the process stands by in a state in which a request can be accepted at any time, until an execution instruction, i.e., request is received from the client or another WEB service flow processing.

Processing 813 is to execute a workflow by the flow processing apparatus 102. If a request 815 to execute the WSBPEL 802 is received from a client 814 in the execution instruction standby state 812, the contents of the WSBPEL 802 are sequentially executed in 816 on the basis of the instance information 810. When the turn to execute the <link> tag part 803 comes, the flow processing apparatus 102 executes it on the basis of the instance information 811 containing the <link> tag information of the instance format.

The instance information 811 containing the <link> tag information of the instance format has contents to execute the <link> tag part 803 by referring to part of the WSBPEL 801. Thus, the flow processing apparatus 102 issues an execution instruction to 809. In 809, an execution instruction has been issued from the instance containing the <link> tag information of the instance format. The flow processing apparatus 102 specifies a part of the instance 808 that is to be executed, and executes the specified part in 817.

After the end of executing the process, the flow processing apparatus 102 issues an end notification to an invoker 816, and notifies the execution result. In 816, the remaining flow processing is executed. After the end of flow processing, the flow processing apparatus 102 replies to the invoking client in 817.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199236, filed on Jul. 31, 2007, which is hereby incorporated by reference herein in its entirety.

What is claimed is:

1. A method of processing a flow description document, the method comprising steps of:
   extracting, from a first flow description document, a first description which specifies services to be invoked by the first flow description document, and extracting, from a second flow description document, a second description which specifies services to be invoked by the second flow description document;
   detecting a common part between the first description of the first flow description document and the second description of the second flow description document, wherein services specified by the first description extracted from the first flow description document include one or more services among services specified by the second description extracted from the second flow description document; and
   rewriting the common part in the second flow description document into a reference to the common part in the first flow description document,
   wherein the reference includes identification information of the first flow description document, and information which specifies a start tag and end tag of the common part.

2. The method according to claim 1, wherein in the rewriting step, the first flow description document and the second flow description document whose common part has been rewritten into the reference to the common part in the first flow description document are stored in a memory in an executable format.

3. The method according to claim 1, wherein in the detecting step, whether a WEB service interface document identical to an input WEB service interface document has already been registered is further determined, and if the identical WEB service interface document has not been registered, the input WEB service interface document is registered.

4. The method according to claim 1, wherein in the rewriting step, execution of the common part in the first flow description document is designated based on the reference when executing the second flow description document.

5. The method according to claim 1, further comprising:
   a step of expanding the first flow description document into an instance format after the rewriting;
   a step of expanding the second flow description document into the instance format after the rewriting, while the reference is directly expanded into the instance format; and
   an execution step of executing the services specified by the second flow description document on the basis of the expanded second flow description document, if receiving a request to execute the second flow description document;
   wherein during execution of the services specified by the second flow description document, the expanded reference is processed in the execution step to specify a part of the expanded first flow description document to be executed, the expanded reference being instance information to execute the specified part of the expanded first flow description document.

6. The method according to claim 1, wherein the start tag and the end tag of the common part are tags of a markup language.

7. A flow description document processing apparatus comprising:
   an extracting unit constructed to extract, from a first flow description document, a first description which specifies services to be invoked by the first flow description document, and extract, from a second flow description document, a second description which specifies services to be invoked by the second flow description document;
   a detection unit constructed to detect a common part between the first description of the first flow description document and the second description of the second flow description document, wherein services specified by the first description extracted from the first flow description document include one or more services among services specified by the second description extracted from the second flow description document; and
   a rewrite unit constructed to rewrite the common part in the second flow description document into a reference to the common part in the first flow description document,
   wherein the reference includes identification information of the first flow description document, and information which specifies a start tag and end tag of the common part.

8. The apparatus according to claim 7, wherein said rewrite unit stores, in a memory in an executable format, the first flow description document and the second flow description document whose common part has been rewritten into the reference to the common part in the first flow description document.

9. The method according to claim 7, wherein said detection unit comprises a determination unit which determines whether a WEB service interface document identical to an input WEB service interface document has already been registered, and a registration unit which, if the identical WEB service interface document has not been registered, registers the input WEB service interface document.

10. The apparatus according to claim 7, wherein said rewrite unit designates execution of the common part in the first flow description document on the basis of the reference when executing the second flow description document.

11. The apparatus according to claim 7, further comprising:
an expanding unit constructed to expand the first flow description document into an instance format after the rewriting, and expand the second flow description document into the instance format after the rewriting, while the reference is directly expanded into the instance format; and
an executing unit constructed to execute the services specified by the second flow description document on the basis of the expanded second flow description document, if receiving a request to execute the second flow description document;
wherein during execution of the services specified by the second flow description document, the executing unit processes the expanded reference to specify a part of the expanded first flow description document to be executed, the expanded reference being instance information to execute the specified part of the expanded first flow description document.

12. The apparatus according to claim 7, wherein the start tag and the end tag of the common part are tags of a markup language.

13. A computer-readable storage medium retrievably storing a computer-executable program for causing a computer to process a flow processing document, the computer program comprising steps of:
extracting, from a first flow description document, a first description which specifies services to be invoked by the first flow description document, and extracting, from a second flow description document, a second description which specifies services to be invoked by the second flow description document;
detecting a common part between the first description of the first flow description document and the second description of the second flow description document, wherein services specified by the first description extracted from the first flow description document include one or more services among services specified by the second description extracted from the second flow description document; and
rewriting the common part in the second flow description document into a reference to the common part in the first flow description document,
wherein the reference includes identification information of the first flow description document, and information which specifies a start tag and end tag of the common part.

14. The medium according to claim 13, wherein in the rewriting step, the first flow description document and the second flow description document whose common part has been rewritten into the reference to the common part in the first flow description document are stored in a memory in an executable format.

15. The medium according to claim 13, wherein in the detecting step, whether a WEB service interface document identical to an input WEB service interface document has already been registered is further determined, and if the identical WEB service interface document has not been registered, the input WEB service interface document is registered.

16. The medium according to claim 13, wherein in the rewriting step, execution of the common part in the first flow description document is designated based on the reference when executing the second flow description document.

* * * * *